(12) United States Patent
Short

(10) Patent No.: US 11,084,050 B2
(45) Date of Patent: Aug. 10, 2021

(54) PULSED SPRAYBAR INJECTOR

(71) Applicant: Delavan Inc, West Des Moines, IA (US)

(72) Inventor: John E. Short, Norwalk, IA (US)

(73) Assignee: Delavan Inc., West Des Moines, IA (US)

( * ) Notice: Subject to any disclaimer, the term of this patent is extended or adjusted under 35 U.S.C. 154(b) by 618 days.

(21) Appl. No.: 15/477,583

(22) Filed: Apr. 3, 2017

(65) Prior Publication Data

US 2018/0280997 A1    Oct. 4, 2018

(51) Int. Cl.
*B05B 1/34* (2006.01)
*B05B 1/30* (2006.01)
(Continued)

(52) U.S. Cl.
CPC ............ *B05B 1/3473* (2013.01); *A01G 25/09* (2013.01); *A01M 7/0014* (2013.01); *B05B 1/083* (2013.01); *B05B 1/1618* (2013.01); *B05B 1/20* (2013.01); *B05B 1/3053* (2013.01); *F01N 3/025* (2013.01); *F01N 3/0293* (2013.01); *F01N 3/206* (2013.01); *F01N 3/2066* (2013.01); *F01N 3/36* (2013.01);
(Continued)

(58) Field of Classification Search
CPC ..... B05B 1/3473; B05B 1/083; B05B 1/1618; B05B 1/20; B05B 1/3053; B05B 1/3468; F16K 11/044; Y10T 137/87917; Y10T 137/88054
See application file for complete search history.

(56) References Cited

U.S. PATENT DOCUMENTS 2,571,583 A * 10/1951 Kolbach ................. B05B 1/302
239/537
3,213,294 A    10/1965 Okuda
(Continued)

FOREIGN PATENT DOCUMENTS

CN    102104248 A    6/2011
GB    2277891    * 11/1994    ............... B05B 1/32
(Continued)

OTHER PUBLICATIONS

Extended European search report for European Patent Application No. 18164997.1, dated Jul. 23, 2018.
(Continued)

*Primary Examiner* — Alex M Valvis
*Assistant Examiner* — Christopher R Dandridge
(74) *Attorney, Agent, or Firm* — Locke Lord LLP; Joshua L. Jones; Scott D. Wofsy

(57) ABSTRACT

A spray bar injector including a spray bar defining a longitudinal axis and including a fluid inlet and a plurality of spray outlet orifices spaced apart longitudinally in a direction along the longitudinal axis. A check or spray valve is operatively connected to each spray outlet orifice. A master valve is in fluid communication with the fluid inlet, operatively connected to divert flow from the fluid inlet into a first passage and block flow into a second passage in a first position to open the check valves and issue a spray from the spray outlet orifices, and to divert flow from the fluid inlet into the second passage and block flow into the first passage in a second position to close the check valves and block issue of spray from the spray outlet orifices.

11 Claims, 3 Drawing Sheets

(51) Int. Cl.
*B05B 1/08* (2006.01)
*B05B 1/20* (2006.01)
*B05B 1/16* (2006.01)
*A01G 25/09* (2006.01)
*A01M 7/00* (2006.01)
*F01N 3/20* (2006.01)
*F01N 3/029* (2006.01)
*F01N 3/36* (2006.01)
*F01N 3/025* (2006.01)

(52) U.S. Cl.
CPC ......... *B05B 1/3006* (2013.01); *F01N 2240/14* (2013.01); *F01N 2610/00* (2013.01); *F01N 2610/02* (2013.01); *F01N 2610/1453* (2013.01)

(56) References Cited

U.S. PATENT DOCUMENTS

| | | | | |
|---|---|---|---|---|
| 4,813,452 A | * | 3/1989 | Smith | F16K 1/12 137/514.7 |
| 6,556,394 B1 | | 4/2003 | Wilson | |
| 6,899,288 B2 | * | 5/2005 | Filicicchia | B05B 7/0884 239/424 |
| 7,520,266 B2 | * | 4/2009 | Barnes | F02M 57/02 123/198 D |
| 8,888,017 B2 | | 11/2014 | Ponnathpur et al. | |
| 9,422,850 B2 | | 8/2016 | Myer et al. | |
| 2003/0034072 A1 | | 2/2003 | Bui et al. | |
| 2012/0287540 A1 | | 11/2012 | Dobkin et al. | |

FOREIGN PATENT DOCUMENTS

| | | |
|---|---|---|
| JP | H0468918 A | 3/1992 |
| WO | WO-2008/038816 A1 | 4/2008 |
| WO | WO-2016/161079 A1 | 10/2016 |

OTHER PUBLICATIONS

Extended European Search Report dated Oct. 9, 2018, issued during the prosecution of European Patent Application No. EP 18170647.4, 8 pages.

* cited by examiner

PULSED SPRAYBAR INJECTOR

BACKGROUND OF THE INVENTION

1. Field of the Invention

The present disclosure relates to injection, and more particularly to pulsed injection for spray bars such as used in injecting reactants or fuel for exhaust gas treatment or the like.

2. Description of Related Art

Conventional exhaust gas treatment systems, such as for diesel exhaust, utilize injectors for various functions in the treatment process including injecting urea or other reactants to neutralize pollutants, and for burners which pyrolyticaly clean filters and catalysts. Dispersion of droplets is a limitation in conventional systems, which can lead to fouled catalysts, for example. Residual fluid collecting on injector tips due to drooling after shutdown forms deposits and plugs injectors.

The conventional techniques have been considered satisfactory for their intended purpose. However, there is an ever present need for improved injection. This disclosure provides a solution for this need.

SUMMARY OF THE INVENTION

A spray bar injector including a spray bar defining a longitudinal axis and including a fluid inlet and a plurality of spray outlet orifices spaced apart longitudinally in a direction along the longitudinal axis. A check or spray valve is operatively connected to each spray outlet orifice. A master valve is in fluid communication with the fluid inlet, operatively connected to divert flow from the fluid inlet into a first passage and block flow into a second passage in a first position to open the check valves and issue a spray from the spray outlet orifices, and to divert flow from the fluid inlet into the second passage and block flow into the first passage in a second position to close the check valves and block issue of spray from the spray outlet orifices.

The master valve can be operatively connected for oscillating actuation to an actuator. The actuator can include an electronically actuated solenoid operatively connected to drive the master valve for pulsed spray from the spray outlet orifices.

The spray bar can include an outer sleeve and an inner body, wherein the first and second passages are defined between outer surfaces of the inner body and an inner surface of the sleeve, and wherein the inner body is sealed against the sleeve isolating the first and second passages from fluid communication therebetween. The fluid inlet of the spray bar can include aligned bores in the sleeve and inner body. The check valves can each include a bore through the inner body in a direction perpendicular to the longitudinal axis from the second passage to the respective spray outlet orifice. The first passage can include a diametrically opposed pair of branches, each circumferentially spaced apart between the spray orifices and the second passage. The first passage can include a radially extending base relative to the longitudinal axis, and an axial bore can provide fluid communication from the fluid inlet of the spray bar to the base of the first passage to supply fluid pressure to the branches of the first passage with the master valve in the first position. The second passage can include a circumferentially extending base in fluid communication with the inlet, wherein radial bores feed fluid from the fluid inlet of the spray bar to the base of the second passage with the master valve in the second position.

Each check valve can include a check element seated in a valve seat, wherein the valve seat is in fluid commination with both the first passage and the second passage, wherein the check element blocks fluid communication through the valve seat between the first passage and the second passage. The valve seat can be longer than the check element to accommodate two positions of the check element within the valve seat including a first position pressed by pressure in the first passage away from the respective spray outlet orifice to allow flow from the first passage to issue from the respective spray outlet orifice, a second position pressed by pressure from the second passage toward the spray outlet orifice for blocking flow from the spray outlet orifice.

Each check valve can include a spin chamber upstream of the respective spray orifice with at least one tangentially directed inlet for fluid communication from the first passage tangentially into the spin chamber to induce spin on fluid issuing from the respective spray outlet orifice. Each spin chamber can have two opposed tangentially directed inlets each in fluid communication with the first passage. At least one of the spray orifices can be configured to issue a spray cone that varies from orifice to orifice.

A spray bar injecting arrangement includes a spray bar defining a fluid inlet and a plurality of spray outlet orifices spaced apart longitudinally along the spray bar. A spray valve is operatively connected to each spray outlet orifice being movable between an open position that allows fluid flow through the spray outlet orifice and a closed position that blocks flow through the spray outlet orifice. A master valve is in fluid communication with the fluid inlet movable between a first position and a second position such that fluid from the fluid inlet urges each of the spray valves toward the open position when the master valve is in the first position and fluid from the fluid inlet urges each of the spray valves toward the closed position when the master valve is in the second position.

The spray bar can be further configured to cause fluid traveling through the plurality of spray outlet orifices to rotate relative to a direction that fluid is traveling as it travels through the spray outlet orifices. The master valve can include a movable member and two seats, wherein the movable member seals against one of the two seats when the master valve is in the first position and the movable member seals to the other of the two seats when the master valve is in the second position. Each of the spray valves can include a movable element and two seats, wherein the movable element seals against one of the two seats when the spray valve is in the open position and the movable element seals to the other of the two seats when the spray valve is in the closed position.

A method of making a pulsed spray bar injector includes forming passage surfaces and valve seats in an inner body, seating valve elements in the valve seats, assembling an oscillating master valve into the inner body, and sliding a sleeve over an inner body to define first and second passages for flow from the master valve to the valve seats.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
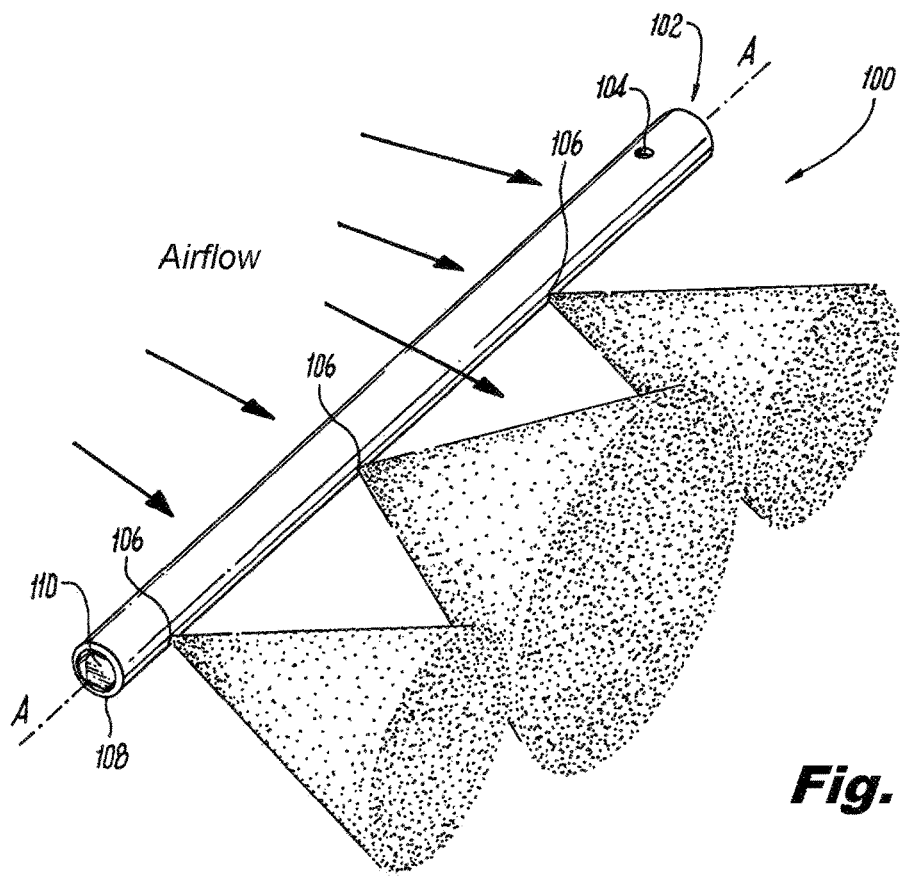
FIG. 1 is a perspective view of an exemplary embodiment of a pulsed spray bar injector constructed in accordance with the present disclosure, showing the inlet and three spray outlet orifices.

Reference will now be made to the drawings wherein like reference numerals identify similar structural features or aspects of the subject disclosure. For purposes of explanation and illustration, and not limitation, a partial view of an exemplary embodiment of a pulsed spray bar injector in accordance with the disclosure is shown in FIG. 1 and is designated generally by reference character 100. Other embodiments of pulsed spray bar injectors in accordance with the disclosure, or aspects thereof, are provided in FIGS. 2-6, as will be described. The systems and methods described herein can be used in any suitable application such as in diesel exhaust treatment systems to issue reactant spray into exhaust gas, issue fuel into burners for clearing exhaust filters, or the like.

Figure 2:
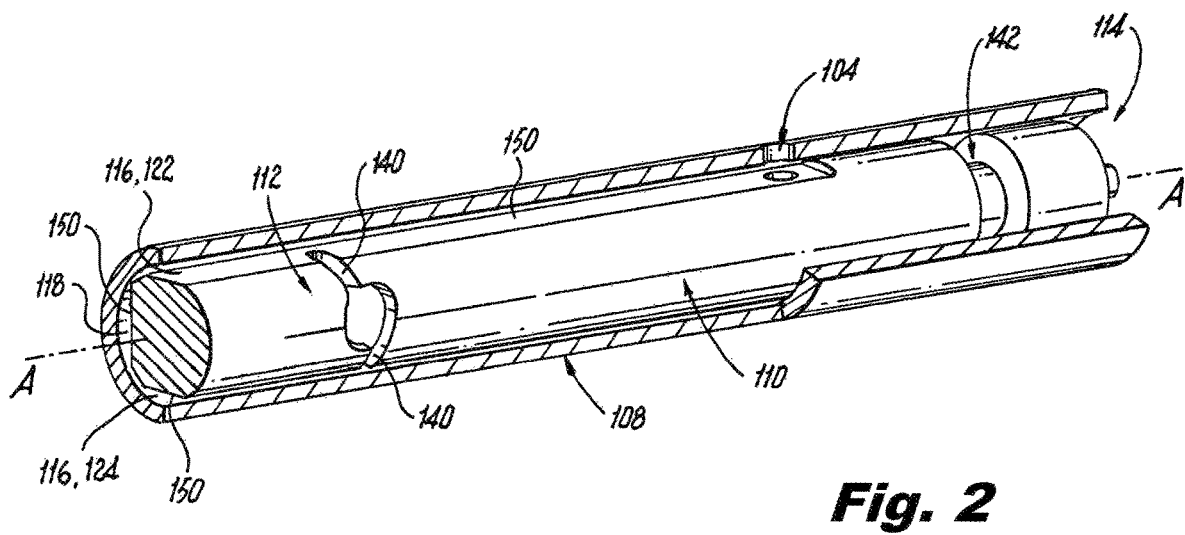
FIG. 2 is a perspective view of a portion of the pulsed spray bar injector of FIG. 1, showing the inner body with the sleeve partially cut away.

The pulsed spray bar injector 100 includes a spray bar 102 defining a longitudinal axis A and including a fluid inlet 104 and a plurality of spray outlet orifices 106 spaced apart longitudinally in a direction along the longitudinal axis A. The spray bar 102 includes an outer sleeve 108 and an inner body 110. As shown in FIG. 2 with the outer sleeve 108 partially removed, a check valve 112 is operatively connected to each spray outlet orifice 106. A master valve 114 is in fluid communication with the fluid inlet 104. The master valve 114 is operatively connected to first and second flow passages 116 and 118, shown schematically in FIG. 2, to divert flow from the fluid inlet 104 for control of the check valves 112.

Figure 3:
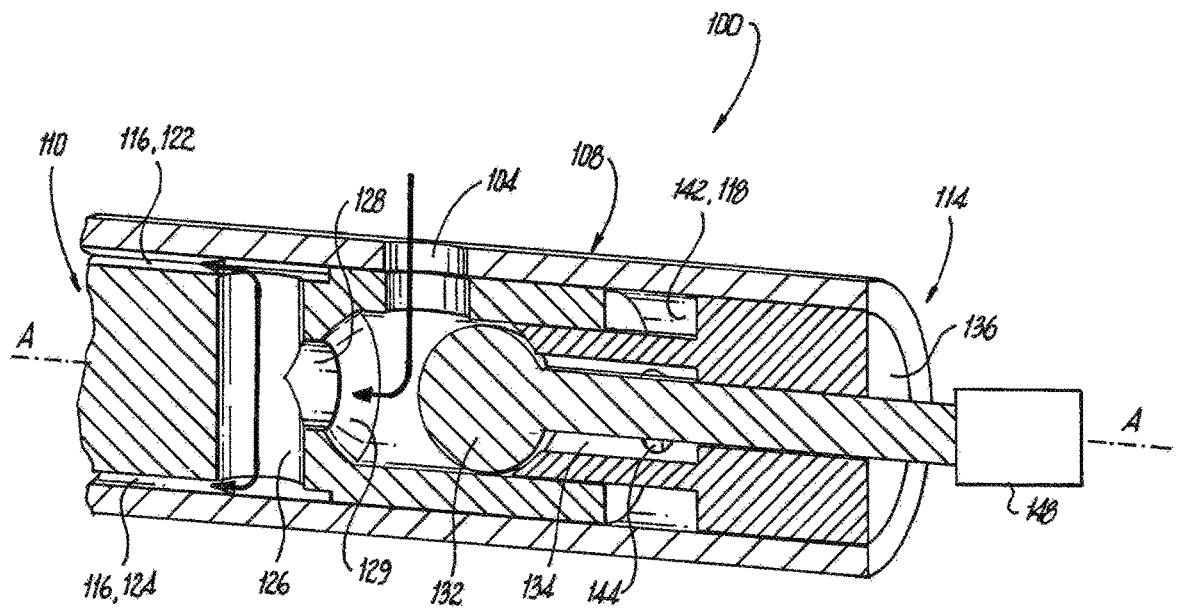
FIG. 3 is a cross-sectional perspective view of a portion of the pulsed spray bar injector of FIG. 1, showing the master valve in the first position to open the check valves.
Figure 5:
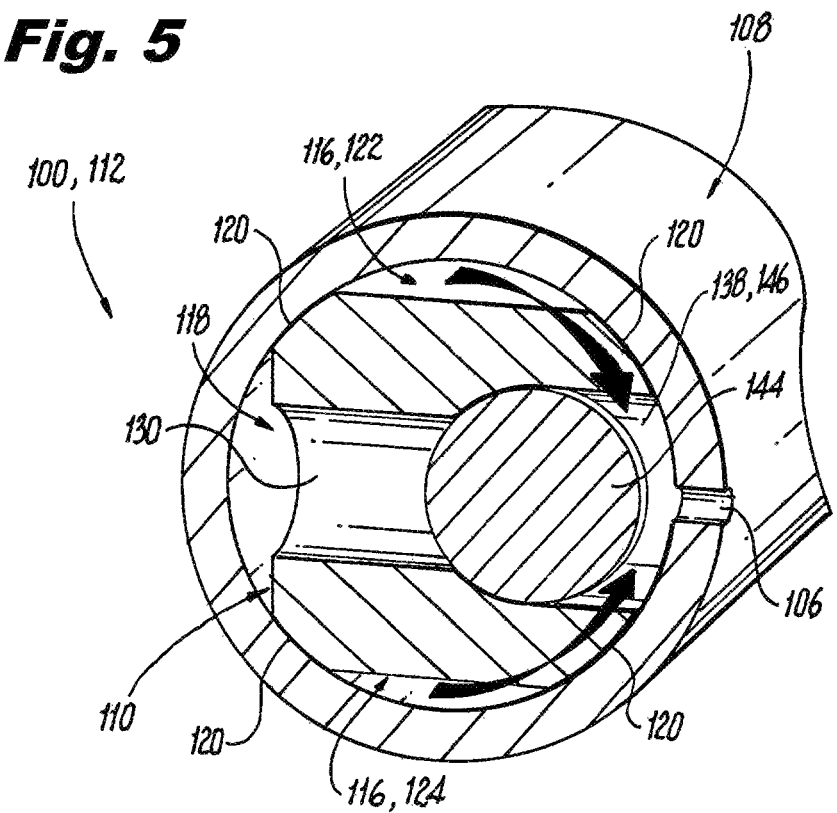
FIG. 5 is a cross-sectional perspective view of a portion of the pulsed spray bar injector of FIG. 1, showing one of the check valves open with the master valve in the first position.
Figure 6:
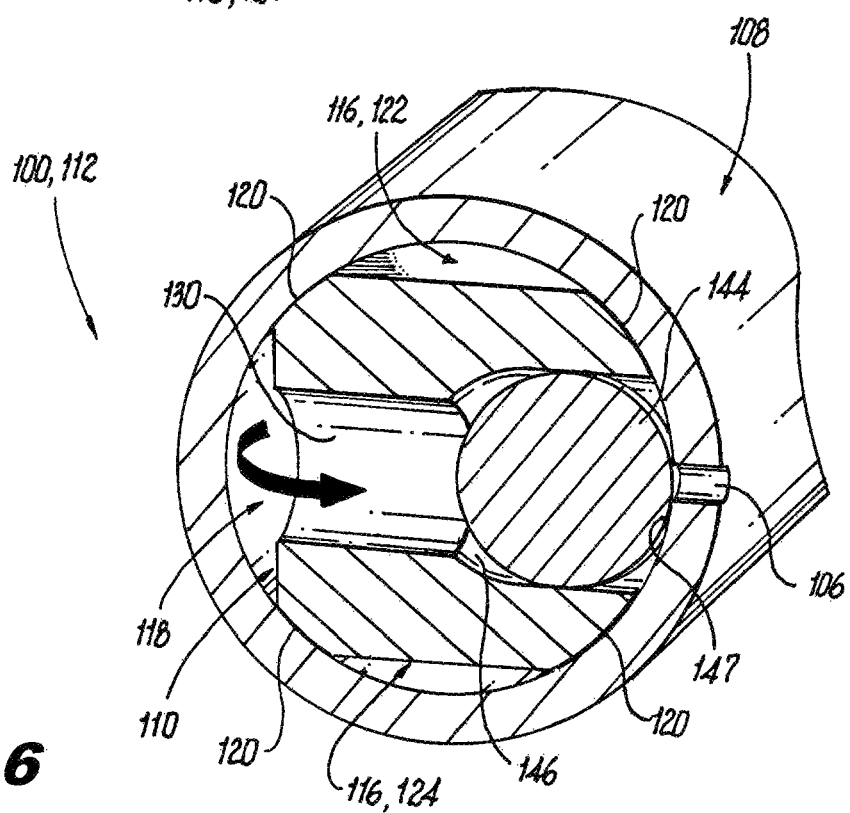
FIG. 6 is a cross-sectional perspective view of a portion of the pulsed spray bar injector of FIG. 1, showing one of the check valves closed with the master valve in the second position.

With reference now to FIG. 3, master valve 114 has two positions, the first of which is shown in FIG. 3. In the first position, master valve 114 is positioned to direct flow from the inlet 104 into the first passage 116 to open the check valves 112 and issue a spray from the spray outlet orifices 106. The first and second passages 116 and 118 are defined between outer surfaces 150 of the inner body 110 and an inner surface of the sleeve 108 as shown in FIG. 2. The inner body 110 is sealed against the sleeve 108, e.g., at locations 120, shown in FIGS. 5 and 6, isolating the first and second passages 116 and 118 from fluid communication therebetween. As shown in FIG. 3, the fluid inlet 104 of the spray bar 100 includes aligned radial bores in the sleeve 108 and inner body 110. The first passage 116 includes a diametrically opposed pair of branches 122 and 124, shown in FIGS. 2, 5, and 6, each circumferentially spaced apart between the spray orifices 106 and the second passage 118.

As shown in FIG. 3, the first passage 116 includes a radially extending base 126 relative to the longitudinal axis A, and an axial bore 128 provides fluid communication from the fluid inlet 104 to the base 126 of the first passage to supply fluid pressure to both branches 122 and 124 of the first passage 116 with the master valve in the first position shown in FIG. 3. The large flow arrows in FIG. 3 schematically show the flow of fluid from inlet 104 to first passage 116. As shown in FIG. 5, the check valves 112 each include a bore 130 through the inner body 110 in a direction perpendicular to the longitudinal axis A from the second passage 118 to the respective spray outlet orifice 106. The ball 132 of master valve 114 blocks flow into a second passage 118 in the first position by seating against the axial bore 134 of end element 136 of inner body 110.

With the master valve 114 in the first position shown in FIG. 3, the check valves 112 are placed into an open position shown in FIG. 5. Each check valve 112 includes a spin chamber 138 upstream of the respective spray orifice 106 with at least one tangentially directed inlet 140, shown in FIG. 2, for fluid communication from the first passage 116 tangentially into the spin chamber 138 to induce spin on fluid issuing from the respective spray outlet orifice 106. Each spin chamber 138 has two opposed tangentially directed inlets 140 each in fluid communication with the first passage 116 by way of one of the respective branches 122 and 124. The flow from first passage 116 into spin chamber 138 is shown schematically by the large flow arrows in FIG. 5. The inlets 140, spin chamber 138, and orifice 106 can be varied as needed, so that each outlet orifice can issue a predetermined flow rate and spray cone, as shown in FIG. 1, were the middle outlet orifice has a wider spray cone than the other two outlet orifices 106.

Figure 4:
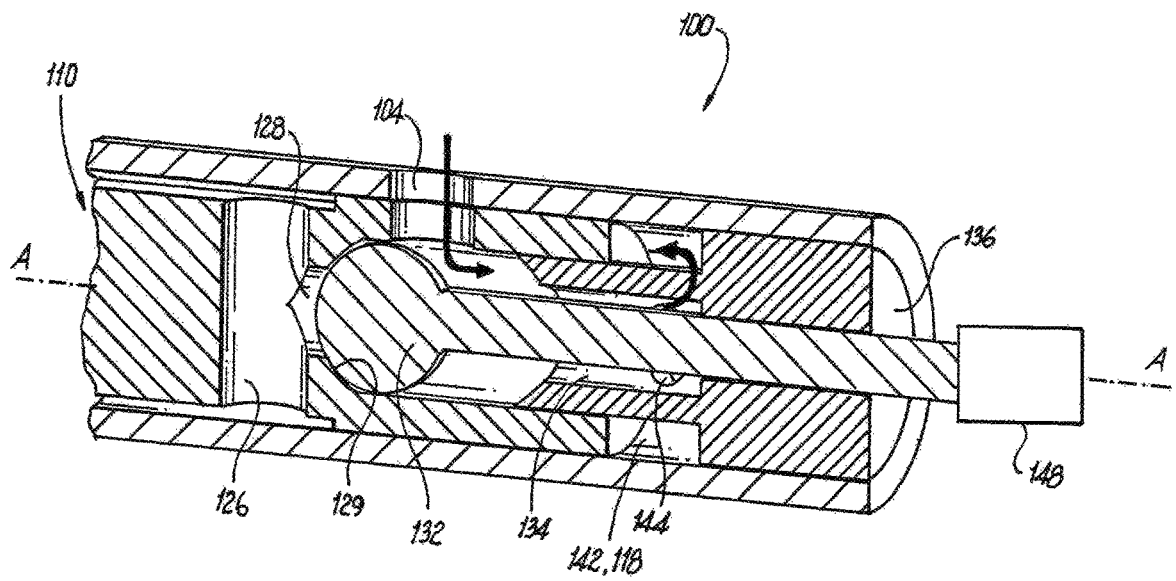
FIG. 4 is a cross-sectional perspective view of a portion of the pulsed spray bar injector of FIG. 1, showing the master valve in the second position to close the check valves.

With reference now to FIG. 4, in its second position, master valve 114 diverts flow from the fluid inlet 104 into the second passage 118 and blocks flow into the first passage 116. The second passage 118 includes a circumferentially extending base 142 in fluid communication with the inlet 104, wherein radial bores 144 feed fluid from the fluid inlet 104 of the spray bar 100 to the base 142 of the second passage 118 with the master valve in the second position. In the second position, the ball 132 seals against seat 129 thereby blocking flow through axial bore 128 and blocking flow into the first passage 116. The flow of fluid is then allowed from the inlet 104 into base 142 of second passage 118 as shown in FIG. 4 schematically with the large arrows.

Referring to FIG. 6, this second position of master valve 114 changes the pressure differential across each check element 144 of the check valves 112 to move the check element 144 into a position pressed against the inside of outlet orifice 106, blocking issue of spray from the spray outlet orifices. Pressure on the second passage side of the check element 144 closes the check valves 112, whereas with the master valve in the first position shown in FIG. 3, the pressure is higher on the spin chamber 138 side of the check element 144, moving the ball back away from the spray orifice 106, allowing the pressurized flow from first passage 116 to issue as a spray from the spray orifice 106. The flow of fluid from second passage 118 causing movement of the check element 144 to close is shown schematically in FIG. 6 by the large arrow.

With continued reference to FIGS. 5 and 6, the check element 144 of each check valve 112 is seated in a valve seat 146. The valve seat 146 is in fluid commination with both the first passage 116 and the second passage 118. The check element 144 blocks fluid communication through the valve seat 146 between the first passage 116 and the second passage 118, isolating them from one another across check element 144. The valve seat 146 is longer than the check element 144 to accommodate the two positions of the check element 144, shown respectively in FIGS. 5 and 6, within the valve seat 146 including a first position pressed by pressure in the first passage 116 away from the respective spray outlet orifice 106 to allow flow from the first passage 116 to issue from the respective spray outlet orifice 106, and a second position pressed by pressure from the second passage 118 toward the spray outlet orifice 106 to seat against valve seat 147 (the inner surface of sleeve 108 surrounding spray outlet orifice 106) for blocking flow from the spray outlet orifice 106. The second passage 118 can be deadheaded, or can drain into a spill return, e.g., for recirculating flow to control temperatures in spray bar injector 100 when the outlet orifices 106 are idle. Check valves 112 are springless check valves and are thus not temperature sensitive, but temperature control may be important in high temperature applications where fuel or reactant in the first and second passages 116 and 118 could break down and form deposits as in coking fuel.

The master valve is operatively connected for oscillating actuation to an actuator 148, which is shown schematically in FIGS. 3 and 4. The actuator 148 includes an electronically actuated solenoid operatively connected to drive the master valve 114 for pulsed spray from the spray outlet orifices 106.

A method of making a pulsed spray bar injector, e.g. pulsed spray bar injector 100, includes forming passage surfaces, e.g., the surfaces 150 and valve seats 146, in an inner body, e.g., inner body 110. The method also includes seating valve elements, e.g., check elements 144, in the valve seats. The method also includes assembling an oscillating master valve, e.g., master valve 114, into the inner body, and sliding a sleeve, e.g., sleeve 108, over the inner body to define first and second passages, e.g. first and second passages 116 and 118, for flow from the master valve to the valve seats. The method can include inserting a valve ball of a master valve, e.g. ball 132 of master valve 114, into the inner body, and assembly of an end element, e.g., end element 136, onto the inner body to lock the ball 132 in place within the inner body.

Since the spray bar 100 can be suspended across a large flow area, such as in a large exhaust system, the spray from orifices 106 can be well placed even in the middle of a flow of exhaust gases, indicated schematically in FIG. 1 with the large arrows. In addition, orifices 106 may be positioned in order to direct spray at various radial angles relative to longitudinal axis A such as downstream, upstream, or perpendicular to the exhaust gas flow. This is in contrast to conventional systems that attempt to spray reactants into exhaust gas from the sides, where poor penetration of sprayed reactant into the center of the flow can result from small spray droplet momentum. While shown and described in the exemplary context of reactant spray in diesel exhaust treatment systems, those skilled in the art will readily appreciate that spray bar injectors as disclosed herein can readily be used in any suitable application, such as in augmenters of gas turbine engines, for example.

As described above, those skilled in the art will readily appreciate that this disclosure provides for a spray bar injecting arrangement in accordance with the following clauses in this paragraph. A spray bar injecting arrangement includes a spray bar defining a fluid inlet and a plurality of spray outlet orifices spaced apart longitudinally along the spray bar. A spray valve is operatively connected to each spray outlet orifice being movable between an open position that allows fluid flow through the spray outlet orifice and a closed position that blocks flow through the spray outlet orifice. A master valve is in fluid communication with the fluid inlet movable between a first position and a second position such that fluid from the fluid inlet urges each of the spray valves toward the open position when the master valve is in the first position and fluid from the fluid inlet urges each of the spray valves toward the closed position when the master valve is in the second position. The spray bar can be further configured to cause fluid traveling through the plurality of spray outlet orifices to rotate relative to a direction that fluid is traveling as it travels through the spray outlet orifices. The master valve can include a movable member and two seats, wherein the movable member seals against one of the two seats when the master valve is in the first position and the movable member seals to the other of the two seats when the master valve is in the second position. Each of the spray valves can include a movable element and two seats, wherein the movable element seals against one of the two seats when the spray valve is in the open position and the movable element seals to the other of the two seats when the spray valve is in the closed position.

The methods and systems of the present disclosure, as described above and shown in the drawings, provide for pulsed spray bar injectors with superior properties including improved spray penetration into gas flows such as in exhaust treatment systems where reactant or burner fuel is sprayed. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A spray bar injector comprising:
   a spray bar defining a longitudinal axis and including a fluid inlet and a plurality of spray outlet orifices spaced apart longitudinally in a direction along the longitudinal axis;
   a spray valve operatively connected to each spray outlet orifice, wherein each spray valve includes a check element seated in a valve seat;
   a master valve in fluid communication with the fluid inlet, operatively connected to:
      divert flow from the fluid inlet into a first passage and block flow into a second passage in a first position to open the spray valves and issue a spray from the spray outlet orifices; and
      divert flow from the fluid inlet into the second passage and block flow into the first passage in a second position to close the spray valves and block issue of spray from the spray outlet orifices, wherein each spray valve includes a spin chamber upstream of the respective spray orifice with an opposed pair of tangentially directed inlets, for fluid communication from the first passage tangentially, in a direction around the respective spray outlet orifice, into the spin chamber to induce spin around each respective spay outlet orifice on fluid issuing from the respective spray outlet orifice, wherein the opposed pair of tangentially directed inlets and the spin chamber are defined in an outer surface of an inner body, and wherein the spray outlet orifices are defined in a sleeve sealed against the inner body.

2. The injector as recited in claim 1, wherein the valve seat is in fluid commination with both the first passage and the second passage, wherein the check element blocks fluid communication through the valve seat between the first passage and the second passage.

3. The injector as recited in claim 2, wherein the valve seat is longer than the check element to accommodate the two positions of the check element within the valve seat including:
the first position pressed by pressure in the first passage away from the respective spray outlet orifice to allow flow from the first passage to issue from the respective spray outlet orifice; and
the second position pressed by pressure from the second passage toward the spray outlet orifice for blocking flow from the spray outlet orifice.

4. The injector as recited in 1, wherein the spray valves each include a bore through the inner body in a direction perpendicular to the longitudinal axis from the second passage to the respective spray outlet orifice.

5. The injector as recited in claim 4, wherein the first passage includes a diametrically opposed pair of branches, each circumferentially spaced apart between the spray orifices and the second passage.

6. The injector as recited in claim 5, wherein the first passage includes a radially extending base relative to the longitudinal axis, and wherein an axial bore provides fluid communication from the fluid inlet of the spray bar to the base of the first passage to supply fluid pressure to the branches of the first passage with the master valve in the first position.

7. The injector as recited in claim 5, wherein the second passage includes a circumferentially extending base in fluid communication with the inlet, wherein radial bores feed fluid from the fluid inlet of the spray bar to the base of the second passage with the master valve in the second position.

8. The injector as recited in claim 1, wherein the fluid inlet of the spray bar includes aligned bores in the sleeve and inner body.

9. The injector as recited in claim 1, wherein the master valve is operatively connected for oscillating actuation to an actuator.

10. The injector as recited in claim 1, wherein the actuator includes an electronically actuated solenoid operatively connected to drive the master valve for pulsed spray from the spray outlet orifices.

11. The injector as recited in claim 1, wherein at least one of the spray outlet orifices is configured to issue a spray cone that varies from orifice to orifice.

* * * * *